United States Patent
Eisenhardt

(10) Patent No.: US 7,044,882 B2
(45) Date of Patent: May 16, 2006

(54) SWITCHABLE GEARBOX OF A HANDHELD POWER TOOL

(75) Inventor: Armin Eisenhardt, Hechingen (DE)

(73) Assignee: Atlas Copco Electric Tools GmbH, Winnenden (DE)

( * ) Notice: Subject to any disclaimer, the term of this patent is extended or adjusted under 35 U.S.C. 154(b) by 112 days.

(21) Appl. No.: 10/708,906

(22) Filed: Mar. 31, 2004

(65) Prior Publication Data
US 2004/0198547 A1    Oct. 7, 2004

(30) Foreign Application Priority Data
Apr. 3, 2003  (DE)  ................. 103 15 138
Feb. 11, 2004  (EP)  ................. 04002981

(51) Int. Cl.
*B23B 47/14* (2006.01)
*F16H 3/44* (2006.01)

(52) U.S. Cl. ................ 475/298; 475/299; 475/317

(58) Field of Classification Search ................ 475/299, 475/298, 317; 173/216
See application file for complete search history.

(56) References Cited

U.S. PATENT DOCUMENTS

| 3,872,742 | A | * | 3/1975 | States ......................... 475/299 |
| 4,617,837 | A | * | 10/1986 | Kataoka et al. ............. 475/298 |
| 6,070,675 | A | * | 6/2000 | Mayer et al. ................ 173/216 |
| 6,086,502 | A | * | 7/2000 | Chung ......................... 475/299 |
| 6,431,289 | B1 | * | 8/2002 | Potter et al. ................ 475/299 |

* cited by examiner

*Primary Examiner*—Sherry Estremsky
(74) *Attorney, Agent, or Firm*—Gudrun E. Huckett

(57) ABSTRACT

A switchable gearbox of a handheld power tool has a gear having a first switching stage and a second switching stage arranged sequentially in an axial direction of the gear, wherein the gear comprises a gear arrangement movable in the axial direction of the gear between the first and second switching stages. An actuator is rotatable about an axis parallel to the axial direction of the gear. At least one shifting gate is rotatable together with the actuator wherein the shifting gate interacts with the gear arrangement for moving the gear arrangement in the axial direction. The shifting gate has a central area extending linearly and at a slant relative to a circumferential direction of the gear and end sections on each end of the central area, wherein the end sections extend parallel to the circumferential direction.

18 Claims, 5 Drawing Sheets

SWITCHABLE GEARBOX OF A HANDHELD POWER TOOL

BACKGROUND OF INVENTION

1. Field of the Invention

The invention relates to switchable gearboxes of a handheld power tool, especially a handheld driver/drill, having an axial direction and a gear arrangement that is movable in the axial direction of the gearbox and is switchable between first and second switching stages. The invention moreover relates to a handheld power tool.

2. Description of the Related Art

Handheld power tools such as power drills, driver/drills and the like have switchable gearboxes that can be switched between at least two switching stages. The two switching stages can be a first speed and a second speed with different initial rotary speed or rpm (revolutions per minute). However, it is also possible to switch between a right-handed and left-handed rotation, between drilling and screwing operation, and the like. Accordingly, the power tools have therefore an external manual actuator for effecting a switching action.

Within the gearbox, an axially movable gear arrangement is provided that is movable by means of the actuator between two different axial positions. The aforementioned gear arrangement engages different counter gears, a coupling member, a lock member, or the like.

An axial movement of the gear arrangement requires an exact alignment, for example, with the toothing of an additional gear, with a locking member or the like. Without proper alignment, switching can be difficult and requires a sensitive handling.

The occurring operating loads, in particular, in connection with a spiral gearing, in connection with changing rotational direction in screwing operation or the like, can cause great forces to act on the movable gear arrangement. Under unfavorable circumstances, this causes the gear arrangement to jump out of the selected switching stage.

SUMMARY OF INVENTION

It is an object of the present invention to configure a gearbox of the aforementioned kind such that a simplified and operationally safe selection of the desired switching stage is provided.

In accordance with the present invention, this is achieved in that an actuator that is rotatable parallel to the axial extension and a shifting gate that rotates together with the actuator are provided, wherein the shifting gate cooperates with the gear arrangement for effecting the switching action.

The invention furthermore has the object to provide a power tool that is improved with regard to manipulating its gearbox.

This object is solved in that a gearbox is provided that has an actuator that is rotatable parallel to the axial extension and a shifting gate that rotates together with the actuator, wherein the shifting gate cooperates with the gear arrangement for effecting the switching action.

A switchable gearbox for a handheld power tool as well as a handheld power tool provided with such a gearbox are proposed, wherein the gearbox comprises a gear arrangement that is movable in the axial direction of the gear and can be switched between two switching stages. The actuator is configured to be rotatable about a rotary axis that is parallel to the axial direction of the gearbox. Moreover, a shifting gate is provided that rotates together with the actuator, wherein the shifting gate cooperates with the gear arrangement for shifting the gear arrangement.

As a result of the selected arrangement, the actuator together with the shifting gate has an actuating direction that is transverse to the movement direction of the gear arrangement. The rotary movement of the actuator and of the shifting gate causes by means of the shifting gate an axial movement of the gear arrangement. When an appropriate selection of the geometry of the shifting gate is made, a great axial force can be exerted on the gear arrangement while only minimal actuating forces are applied to the actuator. The rotary movement was found to be ergonomically beneficial. A reliable and force-saving switching action is enabled.

By providing a shifting gate, a forced guiding action for the gear arrangement is provided. An unambiguous correlation between the circumferential position of the shifting gate and the axial position of the gear arrangement is provided. For a corresponding geometric configuration of the shifting gate, the reverse action of the axial forces of the gear arrangement onto the shifting gate and onto the actuator is minimal. The shifting gate can be self-locking so that a reliable locking action of the gear arrangement in a selected switching stage results.

For this purpose, the shifting gate has expediently a slantedly extending, approximately linear central area. The angle of slant can be designed to provide the self-locking action. This provides a sensitive and precisely defined guiding of the switching action of the gear arrangement with minimal or no reverse action onto the selected position of the actuator.

In an advantageous embodiment, the shifting gate is provided with at least one end section and especially two end sections that extend parallel to the circumferential direction. In the end sections acts as reliable positive-fit locking members for the gear arrangement in one or both selected switching stages. Moreover, by means of the aforementioned end sections it can be prevented that upon actuation of the actuator a selected switching stage is accidentally not completely shifted.

An additional precision of the switching and locking process is expediently provided in that an axially movable guide pin is provided that is moveable with the gear arrangement and engages the shifting gate at least approximately free of play. The play-free arrangement results in a locking of the gear arrangement in precisely defined end positions and enables in the intermediate ranges a sensitive movement. Careful shifting of a selected gear is simplified in this way.

In an advantageous embodiment, two guide pins displaced relative to one another in the circumferential direction are provided that each engage their own shifting gate. This provides a force transmission onto the gear arrangement with minimal or no asymmetries. Canting that would lead to a sluggish movement of the arrangement is prevented.

The guide pin is expediently embodied as a part of a wire bracket that surrounds the gear arrangement within a circumferential groove at least partially and is fixedly secured in the circumferential direction on the housing. The wire bracket can be manufactured inexpensively and with minimal material expenditure. Its guiding within a circumferential groove of the gear arrangement enables a free rotation of the gear arrangement relative to the wire bracket. In the axial direction, a reliable transfer even of greater forces from the wire bracket onto the gear arrangement is possible for the purpose of its axial movement.

In another advantageous embodiment, a locking device is provided for the actuator. In this way, it is prevented that the switchable gear arrangement can get stuck within undesirable intermediate positions. Optionally, the locking device for the actuator can be embodied as a locking arrangement for the axially movable gear arrangement.

In an expedient variant, the locking device acts radially and, in particular, by means of a radially inwardly bent leaf spring that interacts with a radially outwardly projecting projection. The locking device can be arranged between the actuator and the switching member wherein in the axial direction no additional mounting space is required. In this way, a compact configuration in the axial direction is provided.

In an advantageous variant, the locking device acts axially and, in particular, is configured as an axially arranged spring element that interacts with an axial locking recess. The spring element can be arranged especially in a housing of the power tool wherein the actuator must be provided only with an appropriate number of locking recesses. The locking device requires in the area of the actuator and of the switching member practically no special mounting space of its own. The assembly of actuator and switching member can be of a compact design in the axial and radial directions.

In an advantageous configuration, a synchronization device is provided that comprises the actuator and the shifting gate. The shifting gate is arranged in a switching member that is rotatable independently from the actuator. The actuator and the switching member are connected to one another in the circumferential direction by a spring for common actuation. When rotating the actuator, first the spring is pretensioned and, as a result of this, a spring force is acting on the switching member in the same direction as the actuating direction of the actuator. The spring force is deflected by means of the shifting gate in the axial direction and acts in this way in the axial direction on the gear arrangement. Rotating of the switching member and the corresponding movement of the gear arrangement however occur only once the gear arrangement and the gears, the locking member or the like to be engaged are positioned in proper gap alignment. For a position in gap alignment synchronization is realized so that a switching process can be realized reliably and without excessive loading of the engaging parts. The actuator can be actuated independently of the synchronization state as desired. Switching and locking in the selected switching position by means of the shifting gate is realized only when the synchronized state has been reached.

For improving the synchronization quality, the switching member is rotatable in the circumferential direction and is fixed in the axial direction in a housing of the power tool. This results in a precise and at least approximately direct and play-free interaction between the actuator and the shifting gate and the axially movable gear arrangement. The actuator for actuating the switching member is expediently rotatable in the circumferential direction and is secured relative to the axial direction by being fastened and guided on the switching member itself. In this way, an at least approximately direct and play-free activation chain between the actuator, the switching member, and the gear arrangement can be obtained.

In the aforementioned arrangement, advantageously two springs in the form of pretensioned compression (open-coil) springs are arranged symmetrically to one another in the circumferential direction. The symmetric arrangement leads to a uniform switching movement in both switching directions. With appropriate selection of the spring tension, a sufficiently uniform spring force between the actuator and the switching member can be achieved about the entire differential stroke between the two. As a result of this, in the synchronized state a uniform switching movement of the gear arrangement across the entire switching stroke is realized.

In an expedient alternative embodiment, the spring is in the form of a coil spring that is arranged centrally in the circumferential direction of the actuator. In particular in combination with an axially acting configuration of the locking device, the required mounting space for the actuator and the switching member is minimized.

In another advantageous embodiment, the gearbox is a planetary gear with a ring gear, wherein the ring gear forms the axially movably gear arrangement. The ring gear is positioned relative to the other gear components, i.e., the planet gears and the sun gear, radially externally and is easily accessible for a switching process. Particularly in a configuration in which the actuator and the switching member externally surround the ring gear at least partially and are configured to be rotatable coaxially to the ring gear, a compact and play-free arrangement is enabled that can be easily actuated.

The two selectable switching stages can be a screwing stage and a drilling stage wherein, for example, in the screwing stage a torque limiter can be switched on additionally. It is particularly proposed that by means of the two switching stages speeds of different initial rotary speed or rpm are provided Both speeds can be selected by means of the aforementioned arrangement in a simple and ergonomically beneficial way wherein the gear arrangement is reliably locked for both speeds. By means of the afore described synchronization device, switching is possible in a time-saving way between the two speeds even at moderate rpm.

DETAILED DESCRIPTION

Figure 1:
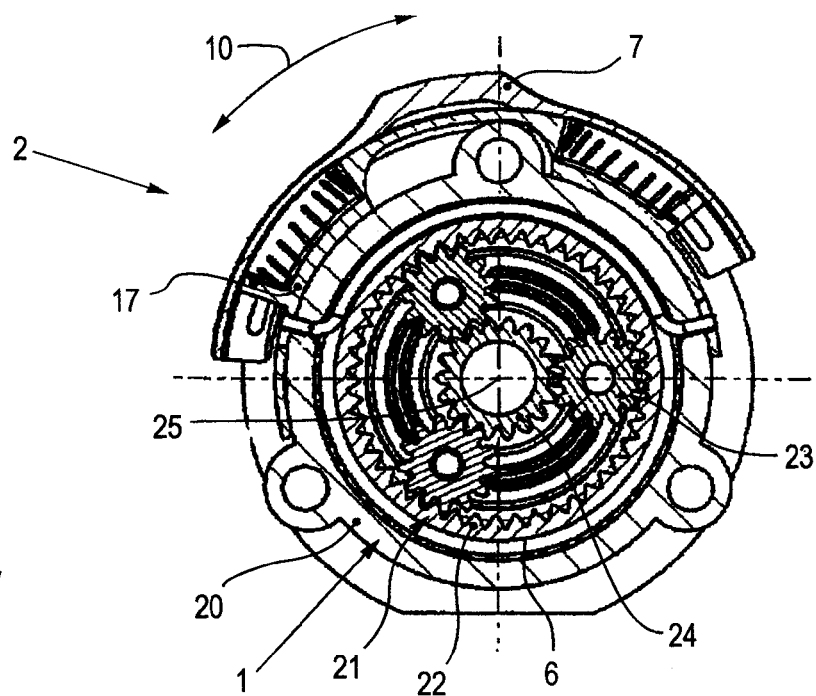
FIG. 1 is cross-sectional illustration of a planetary gear of a power driver/drill with a rotatable actuator for selecting the speed.
Figure 2:
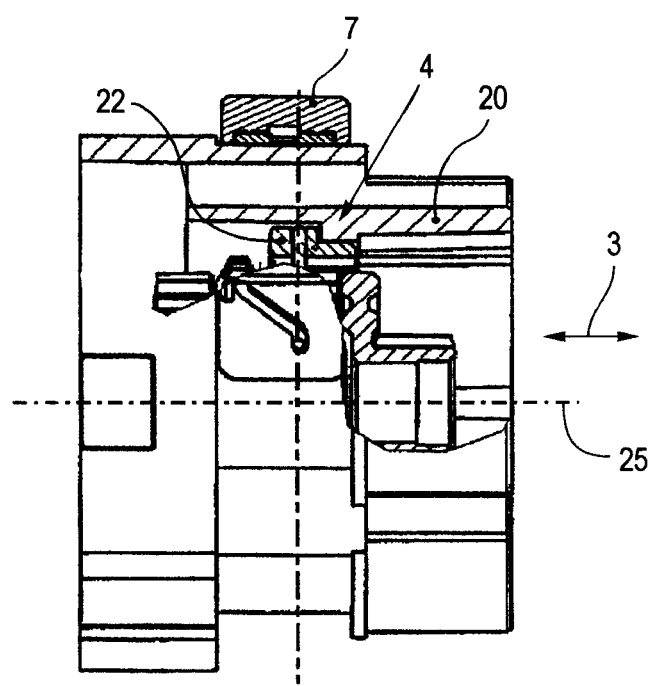
FIG. 2 shows the arrangement of FIG. 1 partially in longitudinal section.
Figure 3:
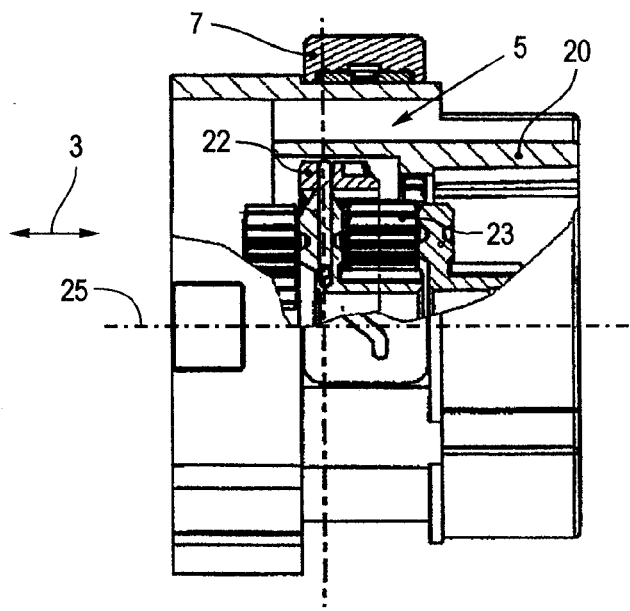
FIG. 3 shows the arrangement of FIG. 2 in a different selected switching stage.

FIG. 1 shows in a cross-sectional illustration a power tool 2 in the area of its gearbox 1. The gearbox 1 is a planetary gear 21 that has concentrically to its axis of rotation 25 a sun wheel 24 and radially outside thereof planetary wheels 23. The planetary wheels 23 are surrounded on their outer side by a ring gear 22. The ring gear 22 forms a gear arrangement 6 that, relative to the axis of rotation 25, is axially movable for switching between two switching stages 4, 5 (FIGS. 2, 3).

For switching between the two switching stages 4, 5 (FIGS. 1, 2), an actuator 7 and a switching member 18 are provided. The actuator 7 and the switching member 18 surround the ring gear 22 partially and are supported to be rotatable in the circumferential direction, indicated by arrow 10, coaxially to the axis of rotation 25 of the ring gear 22.

Instead of the illustrated planetary gear, it is also possible to employ a spur gear or the like having a gear arrangement (6) that is movable in the axial direction.

The power tool 2, not illustrated in detail, is a handheld cordless driver/drill in the illustrated embodiment. It can also be a handheld power drill or the like. In addition to an electrical power supply by means of a battery pack is also possible to provide power through a mains connection.

FIG. 2 shows in a partially sectioned side view the arrangement of FIG. 1. By means of the double arrow 3 the axial direction of the axis of rotation 25 is indicated. The ring gear 22 is movable in the direction of the double arrow 3 by actuating the actuator 7. The ring gear 22 is shown in a first switching stage 4 in which it is locked to the housing 20.

FIG. 3 shows the arrangement of FIG. 2 wherein the ring gear 22 is moved in the axial indirection 3 into a second switching stage 5 in which it is freely rotatable. The switching stages 4 and 5 illustrated in FIGS. 2 and 3 form the two speeds of the planetary gear 21 according to FIG. 1 providing different initial rpms, respectively. The two switching stages 4, 5 can also be embodied as an on-switch and off-switch of a torque limiter, a clutch or the like.

Figure 4:
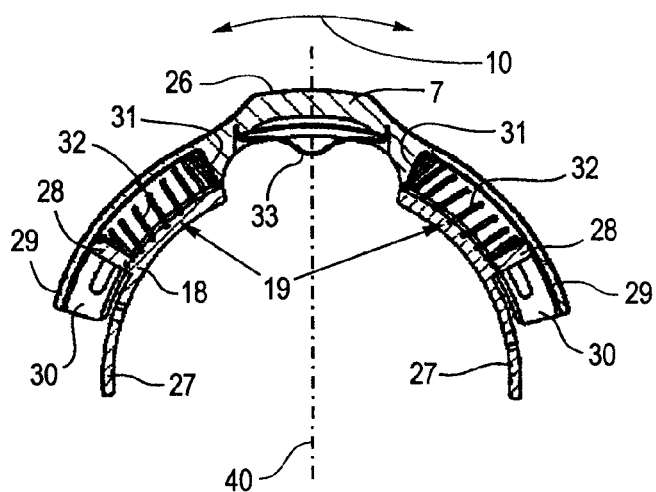
FIG. 4 is detail view of the actuator and of the switching member according to FIG. 1.

FIG. 4 shows a detail view of the arrangement of FIG. 1 in the area of the actuator 7 and of the switching member 18. The illustrated arrangement is symmetrical to a normal axis 40. The switching member 18 has two arc-shaped legs 27 from which a spring holder 28 projects radially, respectively.

The actuator 7 has centrally a switch button 26 for manual actuation that projects in the radial direction. Radially inwardly relative to the switch button 26, a leaf spring 33 is provided. On both sides of the switch button 26, the actuator 7 has a U-shaped cross-section that is comprised of arc-shaped circumferential walls 29 and legs 30. The circumferential walls 29 and the legs 30 span the spring holder 28 with minimal play. The actuator 7 is thus rotatable in the circumferential direction 10 and is secured in the axial direction 3 (FIG. 3) on the switching member 18.

Symmetrically arranged relative to the normal axis 40, a spring arrangement of two springs 19 is provided; in the illustrated embodiment, they are compression springs 32. The compression springs are secured with pretension between the respective spring holders 28 and the correlated springs stops 31 of the actuator 7.

Figure 5:
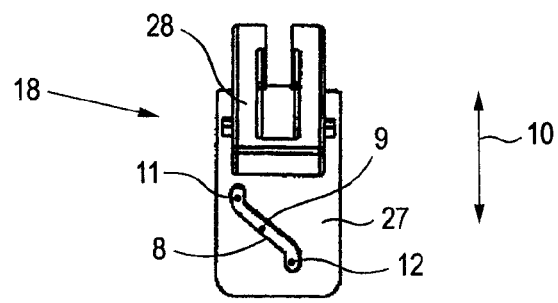
FIG. 5 is a side view of the switching member according to FIG. 4.

FIG. 5 shows the switching member 18 according to FIG. 4 in a side view. The illustrated leg 27 and the opposed leg 27 (FIG. 4) are provided with a shifting gate 8. The shifting gate 8 has a central area 9 slantedly extending relative to the circumferential direction 10 as well as end sections 11, 12 that extend parallel to the circumferential direction 10.

Figure 6:
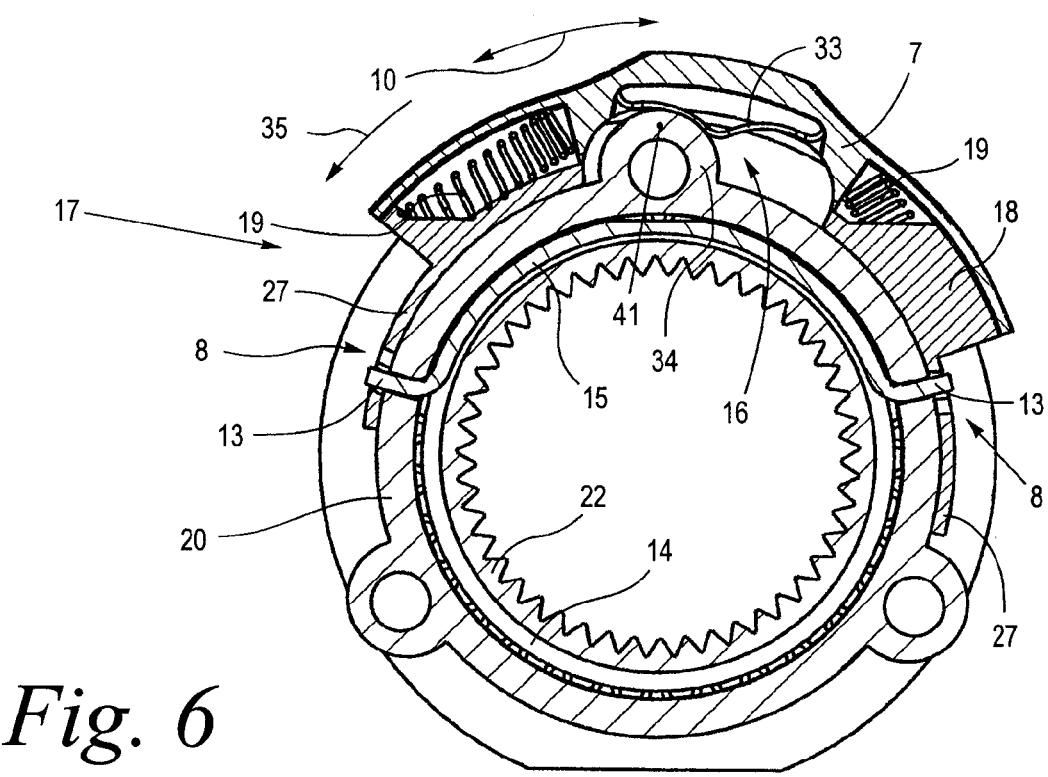
FIG. 6 shows details of a synchronization device of the arrangement of FIG. 1.

FIG. 6 shows a detail view of the arrangement of FIG. 1 with details of the actuator 7, of the switching member 18, and of the ring gear 22. The housing 20 has in the circumferential direction several screw flanges 34. The screw flange 34 facing the leaf spring 33 has a radially outwardly projecting part 41. The leaf spring 33 of the actuator 7 is radially inwardly angled and rests against the projection 41 in an elastic and springy fashion. When rotating the actuator 7 in the direction of the arrow 35, the curved leaf spring 33 snaps into place about the screw flange 34 thus providing a locking device 16 for the actuator 7.

The ring gear 22 has on its exterior a circumferential groove 14 in which a circularly bent wire bracket 15 is positioned. The ends of the wire bracket 15 are radially outwardly bent and form guide pins 13. The guide pins 13 are secured in the housing 20 in the circumferential direction 10 and are movable together with the ring gear 22 in the axial direction. The two guide pins 13 each engage without play their own shifting gate 8 (FIG. 5) provided in the two legs 27 of the switching member 18.

By means of the illustrated arrangement, a synchronization device 17 is formed that comprises the actuator 7, the switching member 18 with the shifting gates 8, as well as the springs 19. The actuator 7 and the switching member 18 are rotatable relative to one another, wherein the actuator 7 and the switching member 18 are connected to one another by means of the springs 19 in the circumferential direction 10.

Figure 7:
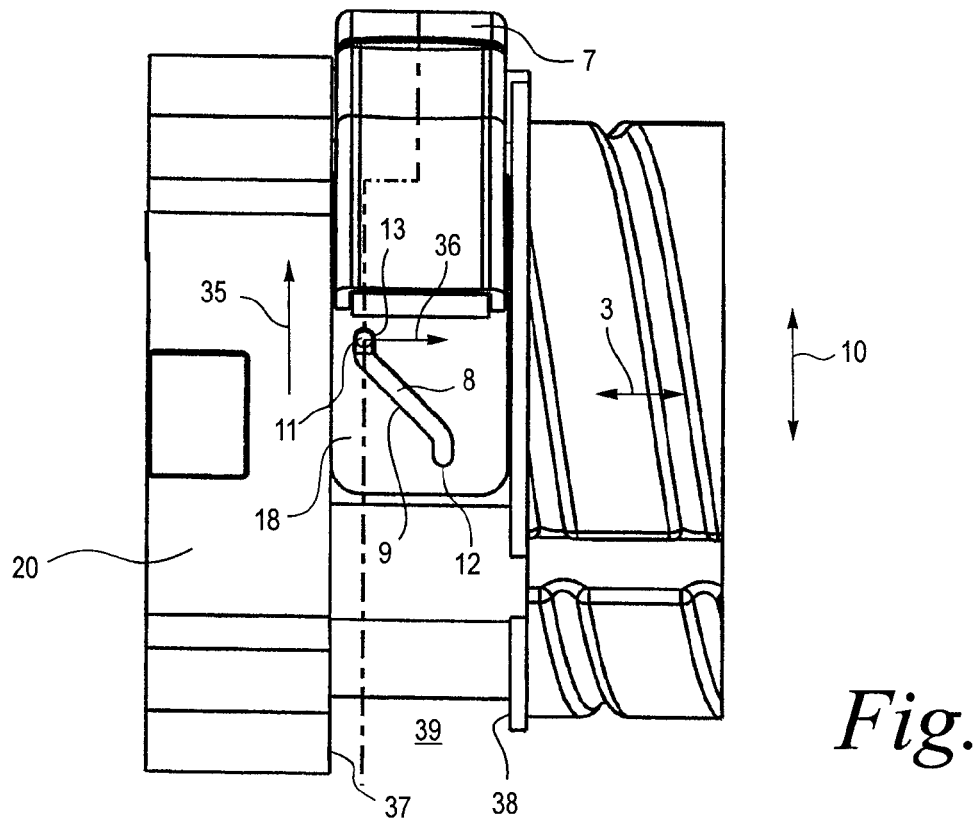
FIG. 7 is a side view of the arrangement of FIG. 6.

FIG. 7 shows the arrangement of FIG. 6 in a side view. The housing 20 has a radial projection 37 and, at a spacing thereto, a circumferential flange 38. Between both, a circumferential groove 39 is formed in which the actuator 7 and the switching member 18 are guided rotatably in the circumferential direction 10 and secured in the axial direction 3. The actuator 7 is illustrated in the rotated position of FIG. 6 wherein the view according to FIG. 7 corresponds to a view from the right relative to the illustration of FIG. 6. The guide pin 13 is positioned in the upper end section 11 of the shifting guide 8. The guide pin 13 that is movable together with the ring gear 22 (FIG. 6) in the axial direction 3 is locked in the end section 11. By guiding the wire bracket 15 with the guide pins 13 in the circumferential groove 14 of the ring gear 22 (FIG. 6), the ring gear 22 is thus locked in the axial direction 3. When rotating the switching member 18 by means of the actuator 7, the guide pin 13 is moved by means of the shifting gate 8 in the direction of arrow 36. By means of the guiding action of the wire bracket 15 in the circumferential groove 14 of the ring gear 22 (FIG. 6), an axial movement of the ring gear 22 into the second end section 12 of the shifting gate 8 determining the second switching position is enabled. The return into the first switching position illustrated in FIG. 7 is realized analogously by the opposite rotation of the switching member 18.

The function of the synchronization device 17 can be seen when comparing the illustrations of FIGS. 6 and 7. For switching the gearbox 1 between the two switching stages 4, 5 (FIGS. 2, 3), first the actuator 7 is rotated in the direction of the arrow 35. Starting with the illustrated locking position, the spring 33 snaps into place when passing across the screw flange 34 and reaches a second locking position. Because of the connection realized by means of the spring 19, the switching member 18 is exposed to a force in the same rotary direction 35. This force acting in the circumferential direction 10 is transmitted by the shifting gate 8 and the wire bracket 15 in the axial direction onto the ring gear 22. Only when the synchronized position of the ring gear 22 is reached, in which its teeth are positioned, for example, between the teeth (aligned with the gaps between the teeth) of the planet gears(FIG. 1), an axial movement of the ring gear 22 together with a rotation of the switching member 18 in the direction of arrow 35 is caused by the spring force of the spring 19. A synchronized position of the ring gear 22 can also result, for example, in the case of fixed locking at the housing 20 for the switching stage 4 illustrated in FIG. 2.

Figure 8:
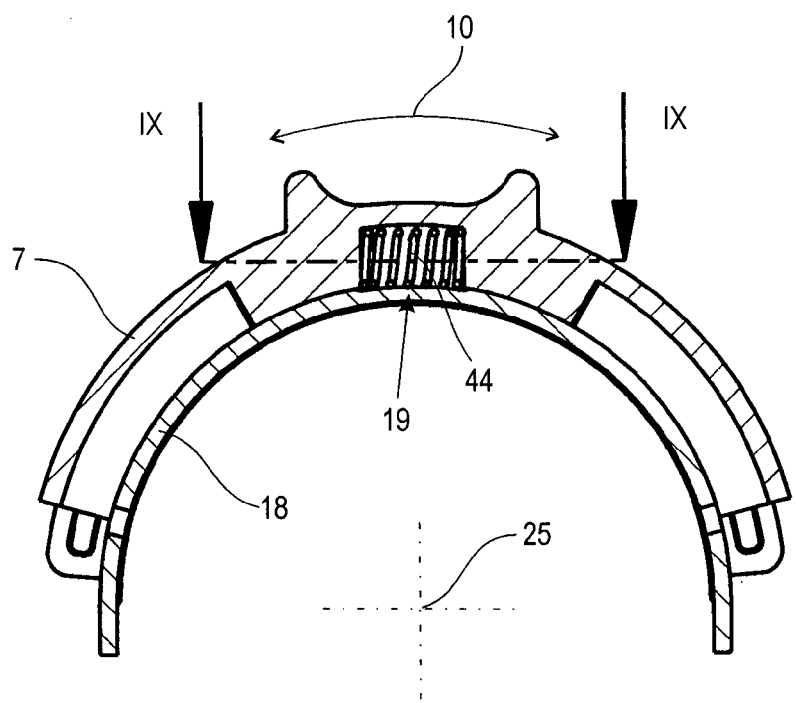
FIG. 8 shows a frontal view in section of an alternative embodiment of the actuator with a spring arranged centrally in the circumferential direction.

FIG. 8 shows in a cross-sectional illustration an alternative embodiment of the actuator 7 and of the switching member 18. The actuator 7 is movable relative to the switching member 18 relative to the axis of rotation 25 in the circumferential direction 10 wherein the actuator 7 and the switching member 18 are connected to one another by means of the spring 19 in the circumferential direction 10. The spring 19 is configured as a coil spring 44 with a longitudinal axis that is tangential to the circumferential direction 10 and is arranged relative to the circumferential direction 10 centrally withing the actuator 7.

Figure 9:
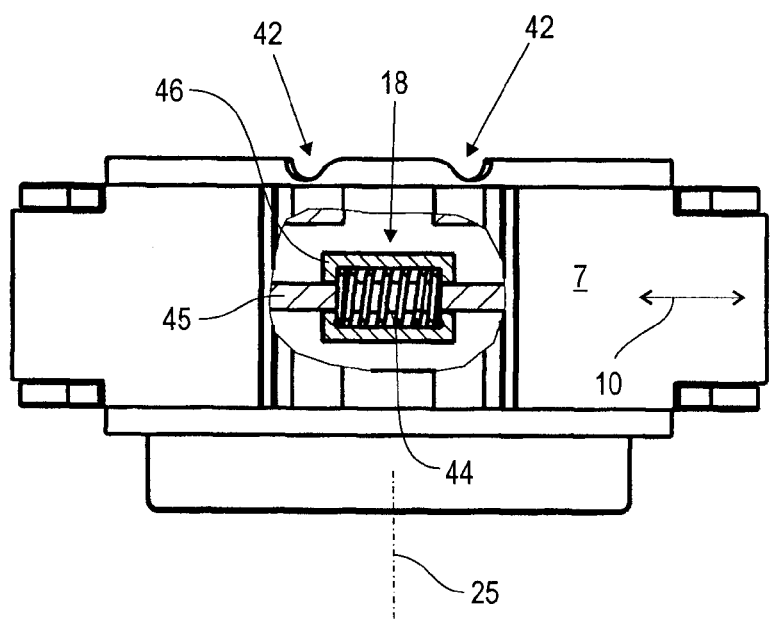
FIG. 9 is partially sectioned plan view of the arrangement of FIG. 8 corresponding to the section line IX—IX.

FIG. 9 shows a plan view of the arrangement of FIG. 8 in a sectioned illustration along the line IX—IX of FIG. 8. The actuator 7 has on its inner side a rib 45 extending in the circumferential direction 10 where the coil spring 44 is secured. On the switching member 18, a spring receptacle 46 is provided that encloses the coil spring 44 and supports the coil spring 44 in the direction of the axis of rotation 25 and in the circumferential direction 10. The rib 45 extends through the spring receptacle 46 in the circumferential direction 10 so that a spring-loaded relative movability of the actuator 7 relative to the switching member 18 in the circumferential direction 10 is provided. The actuator 7 has on its rearward end face two axial locking recesses 42.

Figure 10:
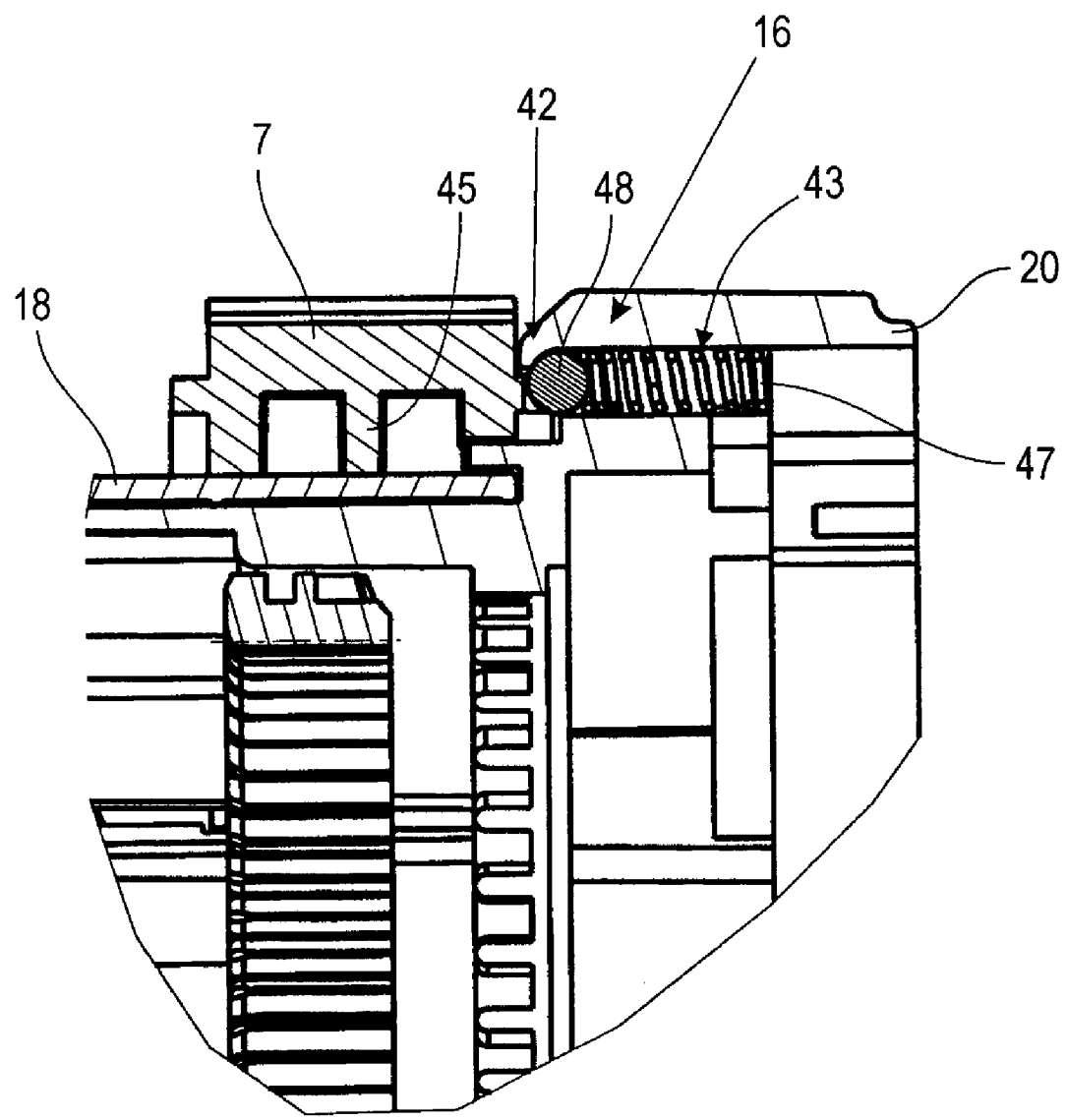
FIG. 10 is a longitudinal section illustrating a detail of the arrangement according to FIGS. 8 and 9 in the area of the locking device.

FIG. 10 shows a longitudinal section of the arrangement according to FIGS. 8 and 9 in a partly enlarged detail view. In the housing 20 an axially acting pressure spring 47 is secured wherein between the pressure spring 47 and the actuator 7 a ball 48 is provided. By means of the force of the pretensioned pressure spring 47, the ball 48 is forced into one of the two locking recesses 42 of the actuator 7 (FIG. 9). By means of the pressure spring 47, the ball 49, and the two locking recesses 42, an axially acting locking device 16 is formed. Upon rotation of the actuator 7 in the circumferential direction 10 (FIG. 9), the ball 48 rolls on the rearward end face of the actuator 7 in the area of the two locking recesses 42. For a rotational position in which one of the two locking recesses 42 is aligned with the ball 48, the ball 48 is forced into the corresponding locking recess 42 so that locking of the actuator 7 is provided. The view of FIG. 9 shows that the two locking recesses 42 are rounded on their facing sides while their sides facing away from one another are steep and sharply angled. The rounded configuration enables easy sliding of the ball 48 in and out of the recesses upon movement of the actuator 7 from one locking position into the other. The outwardly positioned sharp-angled and steep configuration of the locking recesses 42 provided on the outer side limits the actuating path of the actuator 7 to the area between the two locking recesses 42.

While specific embodiments of the invention have been shown and described in detail to illustrate the inventive principles, it will be understood that the invention may be embodied otherwise without departing from such principles.

What is claimed is:

1. A switchable gearbox of a handheld power tool, the switchable gearbox comprising:
    a gear having a first switching stage and a second switching stage arranged sequentially in an axial direction of the gear, wherein the gear comprises a gear arrangement movable in the axial direction of the gear between the first and second switching stages;
    an actuator rotatable about an axis parallel to the axial direction of the gear;
    at least one shifting gate rotatable together with the actuator wherein the shifting gate interacts with the gear arrangement for moving the gear arrangement in the axial direction;
    a switching member rotatable relative to the actuator, wherein the actuator and the switching member are connected to one another in a circumferential direction of the gear by a spring arrangement, wherein the at least one shifting gate is arranged on the switching member, wherein the actuator, the switching member, and the at least one shifting gate provide a synchronization device.

2. The gearbox according to claim 1, wherein the at least one shifting gate has a central area extending linearly and at a slant relative to a circumferential direction of the gear.

3. The gearbox according to claim 2, wherein the at least one shifting gate has end sections on each end of the central area, wherein the end sections extend parallel to the circumferential direction.

4. The gearbox according to claim 1, further comprising at least one guide pin movable together with the gear arrangement in the axial direction and engaging at least substantially without play the at least one shifting gate.

5. The gearbox according to claim 4, wherein two of the at least one guide pin are provided and displaced relative to one another relative to a circumferential direction of the gear, wherein the two guide pins each engage one of the at least one shifting gate.

6. The gearbox according to claim 4, further comprising a wire bracket surrounding at least partially in the circumferential direction of the gear the gear arrangement and being secured in the circumferential direction on a housing of the power tool, wherein the at least one guide pin is a part of the wire brackets.

7. The gearbox according to claim 1, further comprising a locking device for the actuator.

8. The gearbox according to claim 1, wherein the switching member is arranged in a housing of the power tool so as to be rotatable in the circumferential direction and fixed in the axial direction.

9. The gearbox according to claim 1, wherein the actuator is arranged on the switching member to be rotatable in the circumferential direction and fixed in the axial direction.

10. The gearbox according to claim 1, wherein the spring arrangement comprises two pretensioned compression springs arranged in the circumferential direction symmetrically to one another.

11. The gearbox according to claim 1, wherein the spring arrangement is a coil spring arranged centrally on the actuator in the circumferential direction.

12. The gearbox according to claim 1, wherein the gear is a planetary gear comprising a ring gear wherein the ring gear is the gear arrangement.

13. The gearbox according to claim 12, wherein the actuator and the switching member surround the ring gear at least partially and are rotatable coaxially to the ring gear.

14. The gearbox according to claim 1, wherein the first and second switching stages are speeds having different initial rotary speed.

15. The gearbox according to claim 1, wherein the gear is a planetary gear comprising a ring gear wherein the ring gear is the gear arrangement.

16. A power tool comprising a gearbox according to claim 1.

17. A switchable gearbox of a hand held power tool, the switchable gearbox comprising:
    a gear having a first switching stage and a second switching stage arranged sequentially in an axial direction of the gear, wherein the gear comprises a gear arrangement movable in the axial direction of the gear between the first and second switching stages;

an actuator rotatable about an axis parallel to the axial direction of the gear;

at least one shifting gate rotatable together with the actuator wherein the shifting gate interacts with the pear arrangement for moving the gear arrangement in the axial direction;

a locking device for the actuator, wherein the locking device acts in a radial direction and comprises a leaf spring having a radially inwardly bent portion cooperating with a radially outwardly projecting projection.

18. A switchable gearbox of a handheld power tool, the switchable gearbox comprising:

a gear having a first switching stage and a second switching stage arranged sequentially in an axial direction of the gear, wherein the gear comprises a gear arrangement movable in the axial direction of the gear between the first and second switching stages;

an actuator rotatable about an axis parallel to the axial direction of the gear;

at least one shifting gate rotatable together with the actuator wherein the shifting gate interacts with the gear arrangement for moving the gear arrangement in the axial direction;

a locking device for the actuator, wherein the locking device acts axially and comprises a spring element arranged axially and cooperating with an axial locking recess.

* * * * *